(12) United States Patent
Pollock et al.

(10) Patent No.: US 6,850,029 B1
(45) Date of Patent: *Feb. 1, 2005

(54) ELECTRICAL MACHINES

(75) Inventors: Charles Pollock, Rutland (GB); Helen Geraldine Phyllis Pollock, Rutland (GB)

(73) Assignees: Black & Decker, Inc., Newark, DE (US); University of Warwick, Warwichshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/048,432
(22) PCT Filed: Aug. 17, 2000
(86) PCT No.: PCT/GB00/03214
§ 371 (c)(1),
(2), (4) Date: May 20, 2002
(87) PCT Pub. No.: WO01/13508
PCT Pub. Date: Feb. 22, 2001

(30) Foreign Application Priority Data

Aug. 17, 1999 (GB) ............................................. 9919345
Oct. 14, 1999 (GB) ............................................. 9924203

(51) Int. Cl.$^7$ ................................................. H02P 7/36
(52) U.S. Cl. ...................................... 318/727; 318/254
(58) Field of Search ............................... 318/727, 254, 318/701, 138, 139, 432, 434, 439, 599, 738, 728, 731

(56) References Cited

U.S. PATENT DOCUMENTS

| 4,935,708 A | | 6/1990 | Weldon et al. ................. 322/62 |
| 5,001,405 A | * | 3/1991 | Cassat ......................... 318/254 |
| 5,334,917 A | * | 8/1994 | Lind ........................... 318/254 |

(List continued on next page.)

FOREIGN PATENT DOCUMENTS

| DE | 42 04 645 A | 8/1993 |
| EP | 0 735 663 A | 10/1996 |

(List continued on next page.)

OTHER PUBLICATIONS

British Search Report, Application No. GB 9924203.4, dated Jun. 14, 2000.

(List continued on next page.)

Primary Examiner—Hobert Nappi
Assistant Examiner—Renata McCloud
(74) Attorney, Agent, or Firm—Renner, Otto, Boisselle & Sklar, LLP

(57) ABSTRACT

An electrical machine comprises a rotor without windings, a stator having an armature winding 24, 25 and a field winding 10 for generating a magnetomotive force in a direction extending transversely of the magnetomotive force generated by the armature winding. An electronic circuit 40 is provided for controlling the current in the armature winding 24, 25 such that periods in which a magnetomotive force in one direction is associated with a first current pulse alternate with periods in which a magnetomotive force in the opposite direction is associated with a second current pulse. A position sensor is provided for monitoring the rotational position of the rotor and for supplying output signals dependent on the speed of rotation of the rotor. Furthermore a control system 32 supplies control signals to the circuit 40 to control the current in the armature winding 24, 25. In order to enhance the performance at high speed, the control signals are produced in response to sensor output signals which provide an advanced indication of the rotational position of the rotor. Furthermore, in order to prevent oscillation of the rotor on start-up, the control signals supplied to the circuit 40 during an initial start-up period are each produced after a time delay as compared with the production of the control signals over subsequent cycles of rotation during acceleration of the rotor. This can be achieved with simple on/off control of armature and field switching devices, so that the control circuitry can be produced at relatively low cost.

18 Claims, 7 Drawing Sheets

U.S. PATENT DOCUMENTS

| | | | |
|---|---|---|---|
| 5,359,272 A | 10/1994 | Liao | 318/732 |
| 5,650,887 A * | 7/1997 | Dovek et al. | 360/75 |
| 5,739,662 A | 4/1998 | Li | 318/701 |
| 5,789,883 A | 8/1998 | Gilman | 318/254 |
| 5,844,385 A * | 12/1998 | Jones et al. | 318/254 |
| 6,014,001 A * | 1/2000 | Guinet | 318/701 |

FOREIGN PATENT DOCUMENTS

| | | | |
|---|---|---|---|
| GB | 2 194 693 A | 3/1988 | |
| GB | 2 244 571 A | 12/1991 | |
| GB | 2 262 843 A | 6/1993 | |
| SU | 1406697 A1 | 6/1988 | |
| WO | 98/01942 | 1/1998 | |
| WO | 98/05112 | 2/1998 | |

OTHER PUBLICATIONS

British Search Report, Application No. GB 9919345.0, dated Dec. 20, 1999.

British Search Report, Application No. GB 9924203.4, dated Mar. 6, 2000.

British Search Report, Application No. GB 9924203.4, dated Jun. 20, 2000.

British Search Report, Application No. GB 9924203.4, dated Jun. 15, 2000.

* cited by examiner

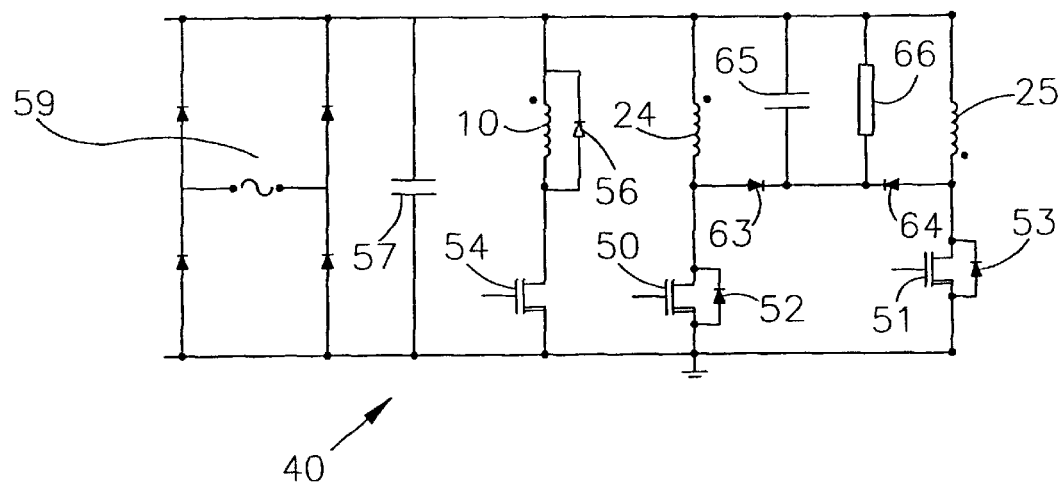
FIG 5ᵃ
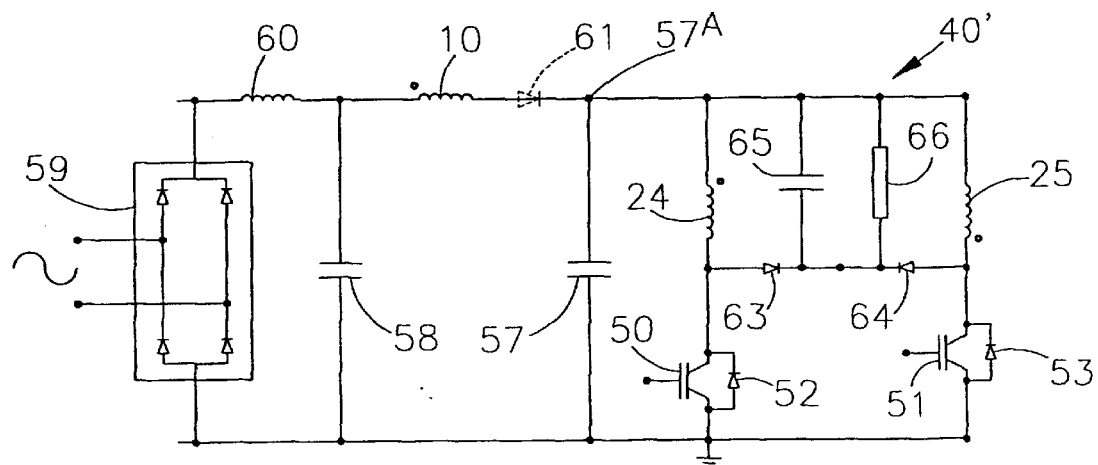
FIG 5ᶜ

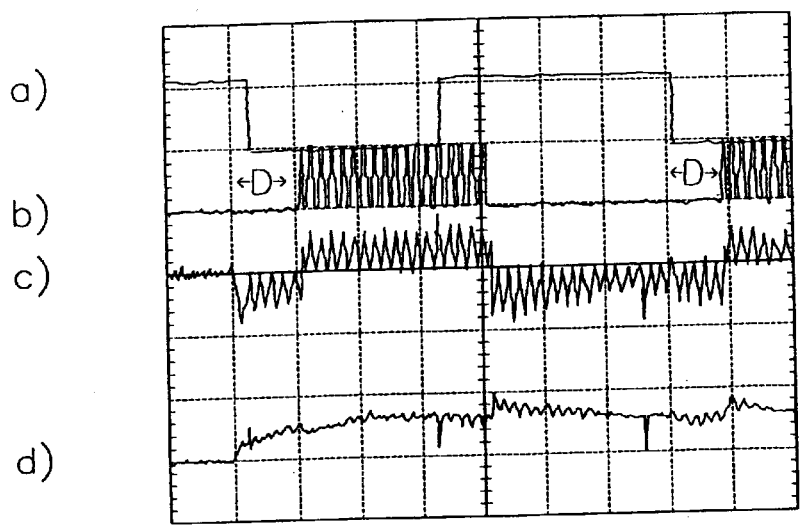
a)
b)
c)
d)
FIG 9
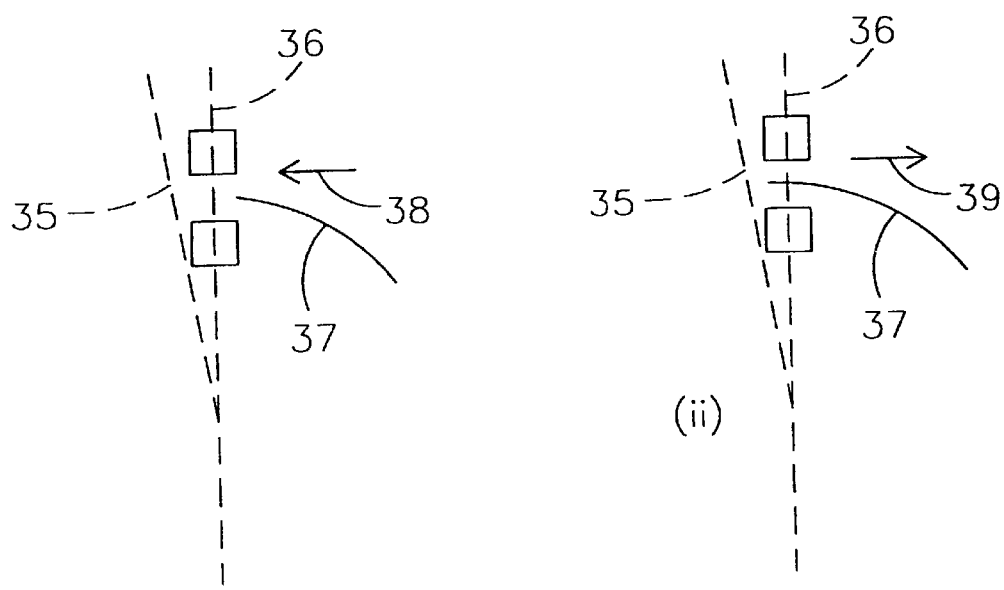
FIG 6ª
FIG 6ᵇ
(ii)

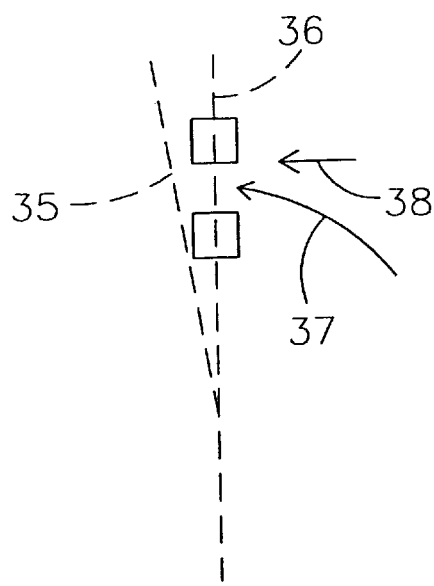
FIG 7ᵃ
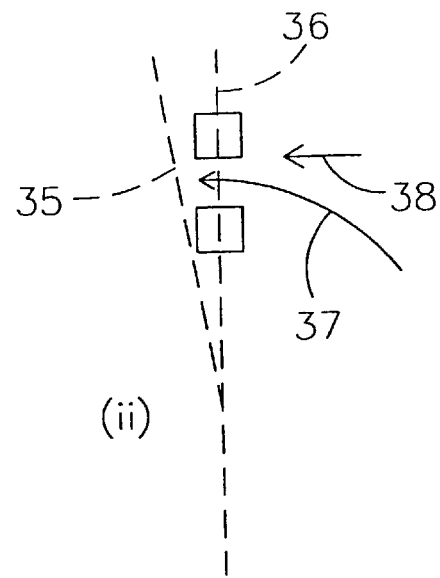
(ii)
FIG 7ᵇ
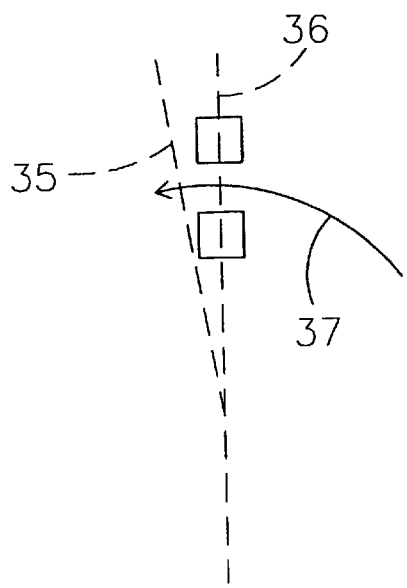
FIG 7ᶜ
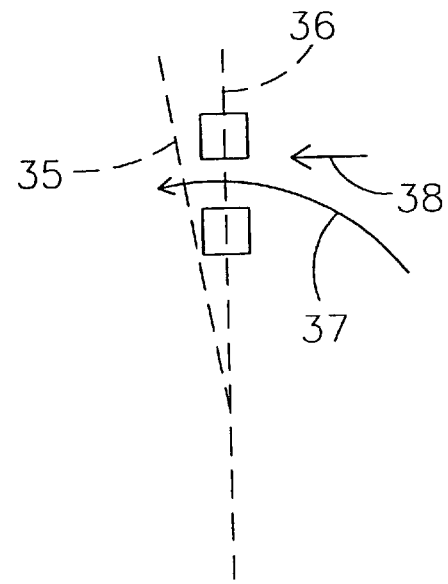
FIG 7ᵈ

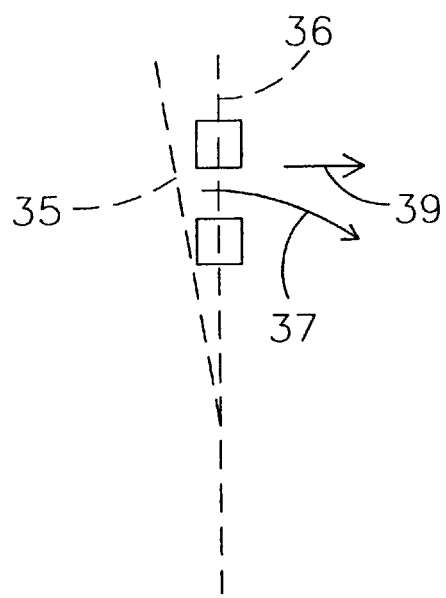
FIG 8ᵃ
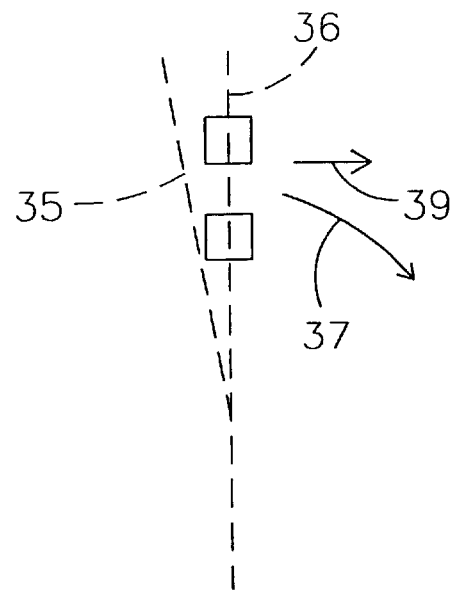
FIG 8ᵇ
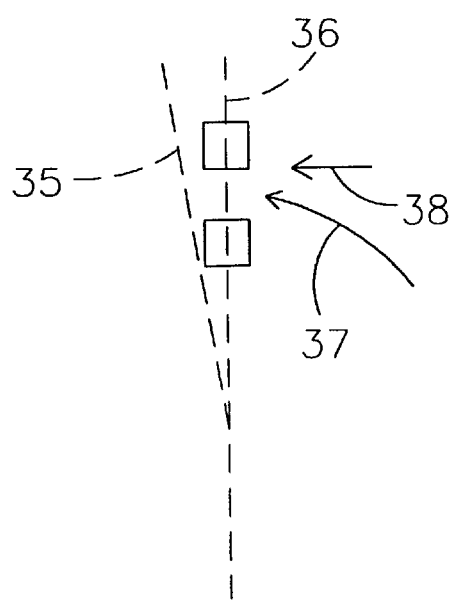
FIG 8ᶜ
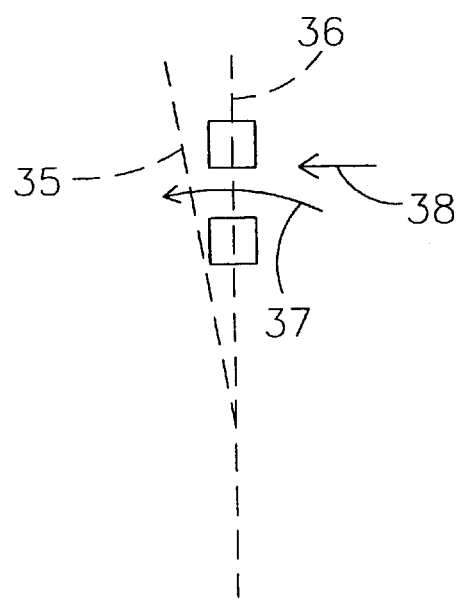
FIG 8ᵈ

ELECTRICAL MACHINES

Reference is also made to the Applicants' co-pending Applications Nos. PCT/GB00/03197, PCT/GB00/03213, PCT/GB00/03201—(M&C Refs: P51192PC, P50874PC and P51248PC) the disclosures of which are incorporated herein by reference.

This invention relates to electrical machines, and is concerned more particularly, but not exclusively, with electric motors.

FIGS. 1a and 1b shows a conventional two-phase variable reluctance motor comprising a stator 2 having two pairs 3, 4 of oppositely disposed inwardly directed salient poles provided with two pairs 5, 6 of energising windings corresponding to the two phases, and a rotor 7 having a single-pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by alternately energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that a commutator and brushes, which are wearing parts, are not required for supply of current to the rotor. Furthermore other advantages are provided because there are no conductors on the rotor and high-cost permanent magnets are not required.

The symbols + and − in FIGS. 1a and 1b show the directions of current flow in the windings in the two alternate modes of excitation in which the rotor 7 is attracted either to the horizontal position or to the vertical position as viewed in the figures. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in only one direction during such energisation. However the windings can only be energised for a maximum of half the time per revolution if useful torque is to be produced, so that highly efficient utilisation of the electrical circuit is not possible with such a motor.

By contrast a fully pitched flux-shifting variable reluctance motor, as described by J. D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803 and as shown in FIGS. 2a and 2b (in which the same reference numerals are used to denote like parts as in FIGS. 1a and 1b) comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two alternate modes of excitation of such a motor corresponding to the horizontal and vertical positions of the rotor 7 are shown in FIGS. 2a and 2b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost.

J. R. Surano and C-M Ong, "Variable Reluctance Motor Structures for Low-Speed Operation", IEEE Transactions on Industry Applications, Vol. 32, No. 2, March/April 1996, pp 808–815 and UK Patent No. 2262843 also disclose fully pitched variable reluctance motors. The motor disclosed in UK Patent No. 2262843 is a three-phase variable reluctance motor having three windings which must be energised with current in synchronism with rotation of the rotor so that such a motor requires an excitation circuit of high complexity.

WO 98/05112 discloses a fully pitched flux-switching motor having a four-pole stator 2 which, as shown diagrammatically in FIG. 3a, is provided with a field winding 10 and an armature winding 11 each of which is split into two coils 22 and 23 or 24 and 25 closely coupled (with a coupling which is substantially independent of rotor position) and wound so that diametrically opposite portions of both coils are disposed within diametrically opposite stator slots. FIG. 3b shows a generalised circuit diagram for energising the armature coils 24 and 25. The coils 24 and 25 are connected within the circuit so that direct current supply to the terminals 26 and 27 flows through both coils 24 and 25 in the same direction so as to generate magnetomotive forces in opposite direction as a result of the opposite winding of the coils. Switches 28 and 29, which may comprise field effect transistors or thyristors for example, are connected in series with the coils 24 and 25 and are switched alternately to effect alternate energisation of the coils 24 and 25 so as to provide the required magnetomotive forces acting in opposite directions. It is an advantage of such an arrangement that the armature winding is made up of two closely coupled coils which enables each coil to be energised with current in only one direction so that relatively simple excitation circuitry can be used. A similar arrangement may be provided in an electrical alternator.

GB 18027 dated 9 Sep. 1901 discloses a variable reluctance machine having sets of windings on the stator which are alternately energised so as to provide the required interaction with the rotor. Furthermore GB 554827 discloses an inductor alternator in which the relative arrangement of the stator and rotor teeth produces successive zones of relatively high and low reluctance, and in which field and alternative current windings are provided on the stator to effect the required energisation. However, neither of these prior arrangements possesses the advantageous feature of the closely coupled coils arrangement of WO 98/05112 so that complex associated circuitry is again required.

The simplifications in the circuitry introduced by WO 98/05112 enable simple and low cost electronic machine control, but reduce the flexibility of the machine to be controlled under rapid acceleration or deceleration, as well as reducing the control of speed under load. It is an object of this invention to provide an electrical machine which has simple control circuitry but can also achieve high performance.

According to the present invention, there is provided an electrical machine comprising a rotor without windings, a stator having a winding, circuit means for controlling the current in the winding, and position sensing means for monitoring the rotational position of the rotor and for supplying output signals at a rate dependent on the speed of rotation of the rotor, characterised by control means for supplying control signals to the circuit means to control the current in the winding in response to said output signals, the control means being arranged to introduce a time delay in the production of each control signal in an initial start-up period as compared with the production of the control signals over subsequent cycles of rotation during acceleration of the rotor, a plurality of output signals being produced by the position sensing means during the initial start-up period which occurs over at least part of the first cycle of rotation of the rotor on start-up of the rotor from rest.

In one embodiment the stator is also provided with field magnet means for generating a magnetomotive force in a direction extending transversely of the magnetomotive force generated by the winding. The field magnet means may be constituted by a shunt or series connected field winding or a permanent magnet.

Such an arrangement is advantageous in that it ensures that the rotor is rotated in the required direction after start-up, regardless of the initial position of the rotor relative to the position sensing means. In the absence of such an arrangement, there is a risk that the start-up routine will produce oscillation of the rotor, particularly where the position sensing means is arranged to provide an advanced indication of the rotational position of the rotor for enhancing operation at high speed. Such an arrangement can be implemented using simple on/off control of switching devices, so that the control circuitry can be produced at relatively low cost.

In order that the invention may be more fully understood, reference will now be made, by way of example, to the accompanying drawings, in which:

FIGS. 5a, 5b and 5c are circuit diagrams showing circuit arrangements for energising the field and armature windings of embodiments of the invention;

FIGS. 6a and 6b are explanatory diagrams showing the phenomenon of rotor oscillation on start-up;

FIGS. 7a, 7b, 7c, 7d and 8a, 8b, 8c, 8d are explanatory diagrams illustrating the start-up sequences in a development of the invention when the rotor is parked just ahead of the sensor transition and just after the sensor transition, respectively; and FIG. 9 is a timing diagram showing the switch control signals applied during low speed operation.

Figure 4:
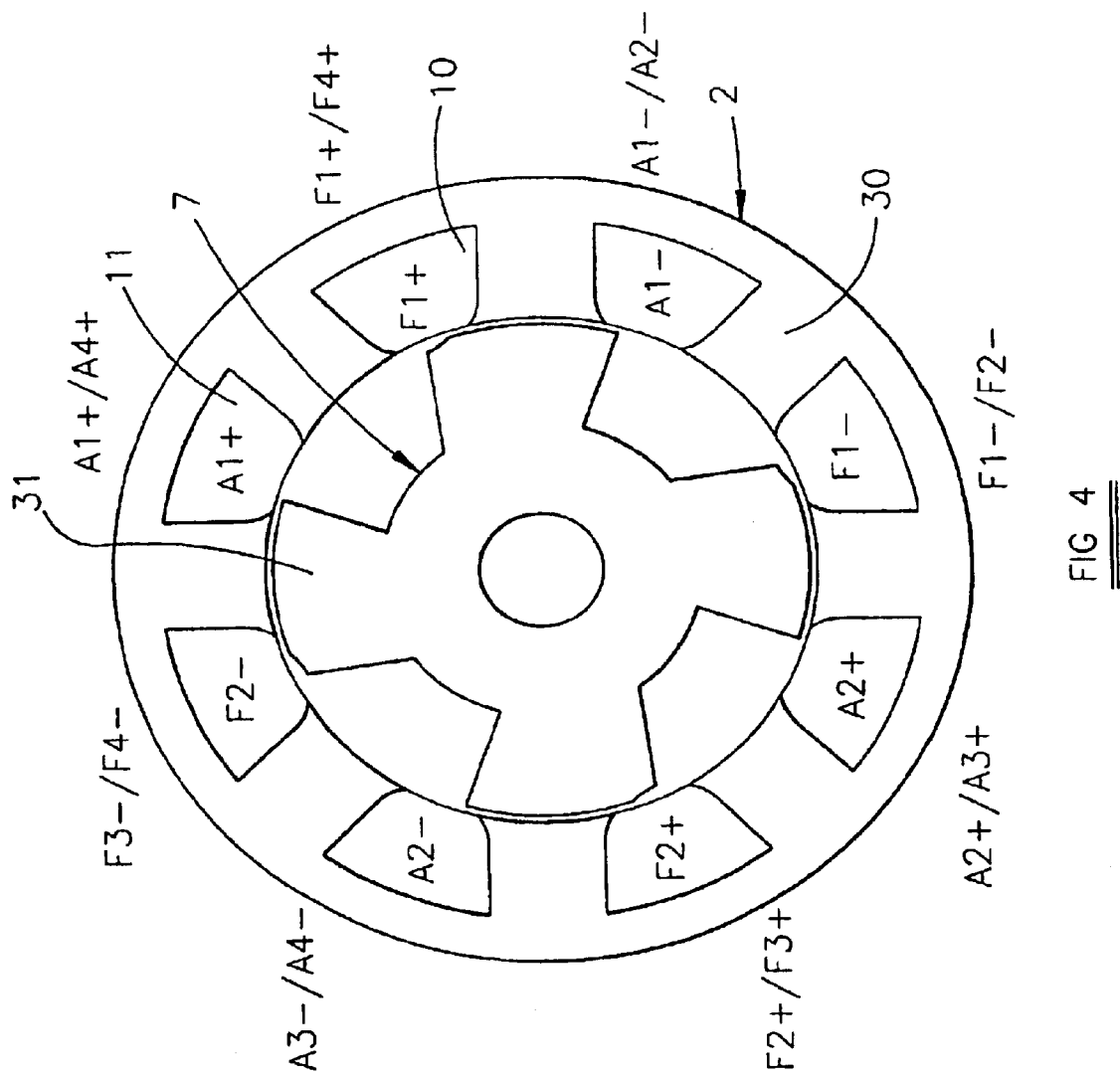
FIG. 4 is a diagram of a flux-switching motor having an 8-pole stator and a 4-pole rotor.

The following description of embodiments of the invention is given with reference to a flux-switching motor having a stator 2 provided with eight inwardly directed salient poles 30 and a rotor 7 having four outwardly directed salient poles 31 without windings, as shown in FIG. 4. The stator 2 is provided with a field winding 10 and an armature winding 11 connected in a shunt or parallel configuration (as shown in FIG. 5a) or in a series configuration (as shown in FIG. 5c). The armature winding 11 may comprise two armature winding parts A1 and A2 connected in series or in parallel, and the field winding 10 may comprise two field winding parts F1 and F2 connected in series or in parallel, the winding parts being wound on the stator 2 as shown within the stator in FIG. 4. Each armature winding part is split into two coils 24 and 25 which are closely magnetically coupled and wound so that diametrically opposite portions of the coils are disposed within stator slots separated by a field winding slot. The armature coils 24 and 25 are wound in opposite directions and may be bifilar wound where appropriate. However the winding configuration is preferably substantially as described with reference to FIG. 6 of WO 98/05112 such that each of the armature and field windings comprises four coils A1, A2, A3, A4 and F1, F2, F3, F4 connected together in series or in parallel (or any combination of series and parallel) and wound around the stator poles such that the active portions of adjacent coils are accommodated within the same stator slot. The winding configuration in this case is shown in FIG. 4 by the symbols indicated outside the stator in the figure. In FIG. 4 the symbols + and − show the directions of current flow in the windings in one mode of excitation, and it will be understood that, in the alternate mode of excitation, the direction of current flow in the armature windings is reversed whereas the direction of current flow in the field windings is unchanged.

In the energisation circuitry 40 of the embodiment of FIG. 5a, the field winding 10 is connected in parallel with the armature coils 24 and 25 and a capacitor 57 which allows the currents through the field winding 10 and the armature coils 24 and 25 to be different. The circuit is supplied from an alternating current source by way of a rectifier bridge 59. A power MOSFET 54 and a freewheeling diode 56 are provided to control the field current supplied to the field winding 10.

In the energisation circuitry 40' of the series embodiment of FIG. 5c, the field winding 10 is connected in series with the armature coils 24, 25, and a capacitor 57 is connected to the interconnection point 57A between the field winding 10 and the armature coils 24, 25 so as to allow the field current to continue to flow as the energy from the armature winding is returned back to the capacitor 57 through one of the diodes 52 or 53. A further capacitor 58 is connected across the output of the rectifier bridge 59, and an optional inductor 60 is connected in series with the output of the rectifier bridge 59, so as to filter the supply to the circuit. As shown in broken lines, it is also possible to provide a diode 61 series with the field winding 10 to prevent the current in the field winding 10 reversing when the capacitor 57 is charged to a voltage above the supply voltage on the capacitor 58. In a further, non-illustrated arrangement, as is shown in FIG. 14 of WO 98/05112, for example, the field winding 10 may be supplied with current from a separate current source.

In each of these embodiments a switching control circuit is provided to supply current alternately to the armature coils 24 and 25 so as to provide the required magnetomotive forces acting in opposite directions to rotate the rotor. In this case the switching control circuit incorporates two power MOSFET's 50 and 51 which are switched on and off alternately by appropriate switching pulses. Each MOSFET 50 or 51 includes an integral freewheeling diode 52 or 53 so that, as each MOSFET is turned off, the stored magnetic energy in the corresponding coil is coupled to the other coil and flows back through the freewheeling diode of the other MOSFET. Furthermore the ends of the armature coils 24 and 25 may be connected by diodes 63 and 64 to a snubber capacitor 65 which charges to a voltage above the supply rail voltage. The snubber capacitor 65 is discharged by the parallel resistor 66 so as to dump the energy stored in the snubber capacitor 65 from the imperfect switching process. The snubber capacitor 65 is provided to capture energy not transferred to the other armature coil when one of the armature coils is switched off by its respective switching device.

The additional snubber circuit formed by the components 63, 64, 65 and 66 is particularly important when insulated gate bipolar transistors (IGBT's) are used as the switching devices. IGBT's are easily damaged by device overvoltage, and the snubber circuit is used to contain the voltages occurring in the circuit to a level less than the voltage rating of the IGBT's. When MOSFET's are used as in FIG. 5a, the snubber circuit can be dispensed with if the MOSFET's are chosen to provide an inherent voltage clamp as they enter a breakdown (avalanche) mode above their rated voltage. This breakdown mode absorbs the uncoupled magnetic energy associated with the imperfect coupling of the armature windings with the MOSFET's. Provided that adequate heat dissipation is available the MOSFET's will not suffer any damage through this process, and the complexity and cost of the snubber circuit is not therefore required.

On initial start-up of the motor, it is necessary to control the field and armature currents so as to provide the desired acceleration. As previously indicated the basis of all control operations for rotation of the rotor is that unidirectional current is supplied to the field winding substantially continuously, and alternate current pulses are supplied to the two armature coils such that the current pulses are synchronised to the position of the rotor. In the motor shown in FIG. 4, with eight stator poles and four rotor poles, a cycle of armature excitation involving positive armature mmf followed by negative mmf would be repeated with every 90° of rotor rotation. As a result it is usual to use a rotor position sensor to control the switching transition points within each armature cycle. In its simplest form the rotor position sensor could be an optical sensor which changes polarity with every 45° of rotation of the rotor, triggered by the interruption or reflection of an infra-red beam by the rotor or a disc mounted on the rotor. Another common means of position detection would be the use of a Hall effect sensor to detect north and south poles on a magnet ring attached to the rotor.

Figure 5B:
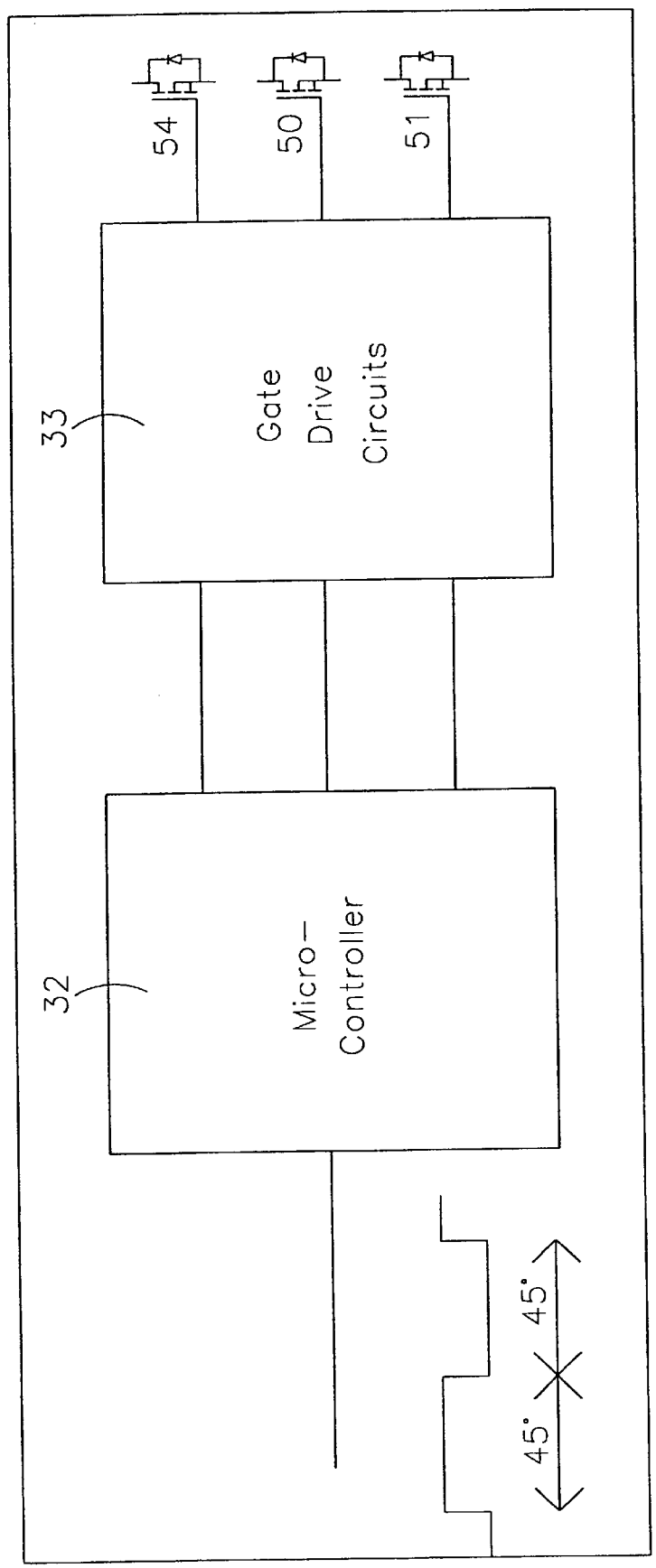

During low-speed operation, the application of the full supply voltage by turning on one of the armature switches for the whole 45° of rotation could cause excessive armature current. The current can be controlled by pulse width modulation of the appropriate armature switch. In a shunt motor, it may also be advantageous to pulse width modulate the switch controlling the field winding current so that the level of the field current is also controlled at the same time as the armature current. The signal from the rotor position sensor would normally be processed by a simple microcontroller 32, as shown in FIG. 5b, which controls the gates of the switches 50, 51 (and 54 if present) by way of gate drive circuits 33. The microcontroller 32 decodes the alternating signal from the position sensor to decide which of the switches 50 and 51 should be conducting at any point in time or perhaps that neither should be conducting. (In normal operation of the motor it is not necessary to have both switches 50 or 51 conducting at the same time.) The microcontroller 32 also determines the operation of the switch 54 (if present) controlling the field current.

The position of the armature current pulses, and hence the rotor position sensor, relative to the actual rotor laminations is critical to obtaining the best performance from the motor. For maximum torque, the armature mmf of positive polarity should be initiated at or just before the induced armature voltage (due to rate of change of field flux coupling the armature winding) becomes positive, i.e. the internally induced armature voltage (the back emf) is in opposition to the applied armature current. As the armature winding is inductive the current takes time to change causing a delay in the build of current relative to the initialisation of the control signal to the appropriate armature switch. At low speeds this time is not a significant angle of rotation but, at high speeds, this delay may lead to a significant loss in output power. There are two ways in which this problem can be solved.

The rotor position sensor can be positioned so that the transitions occur close to the zero crossing of the back emf When running at high speed the microcontroller can use the measured speed to anticipate the sensor transitions and initiate an armature pulse in advance of the sensor transition. Such electronic advancing schemes as such are known. However, at very high speeds when the time between sensor transitions may be short, the accuracy obtained from such schemes can drop unless an expensive microcontroller is employed. Such a scheme is also inaccurate at predicting the advanced turn-on point if there are rapid variations in the running speed.

Alternatively the rotor position sensor may be mechanically positioned, in advance of the zero-crossing of the armature induced voltage, such that at high speed the transitions of the sensor are correctly positioned to ensure that the current has time to build up in each armature winding without requiring any complex control and thus allowing a simple and low cost microcontroller to be used. However such a scheme has the disadvantage that, at low speeds, the sensor transition may initiate a reversal of the armature mmf before it is really required. With such mechanical advancing of the position sensor, it is therefore necessary at low speeds to delay reacting to the sensor transition until the rotor has turned through a further angle equivalent to the angle of mechanical advance. In one implementation of this arrangement, a mechanical advance of the position sensor of 11° was found to be beneficial at high speed (relative to 45° sections of high and 45° sections of low). As this is approximately one quarter of the time between sensor transitions it is relatively easy within a low cost digital microcontroller to insert a time delay of one quarter of the total measured time. The control signals obtained in such an arrangement are shown in FIG. 9 where the position sensor output signals are shown at a), the switch control signals for one armature switch are shown at b) delayed by a time period D, the armature mmf is shown at c) and the field current is shown at d).

Of the above two solutions the method of mechanically advancing the position sensor enables a simpler microcontroller to be used and is preferred for this reason. However, in some applications, a further development is required to initiate rotation of the rotor in the correct direction. This is because the advanced position sensor will, at times, give incorrect information about which armature coil to energise to obtain the correct direction of torque.

An explanation of this phenomenon will now be given with reference to FIGS. 6a and 6b relating to an example in which a desired anti-clockwise rotation of the rotor is intended to be achieved with the position sensor axis 36 positioned 11° ahead of the neutral axis 35 (that is the point at which the induced armature voltage is zero). Initially the output of the sensor is low, and the first armature coil is energised just as the output of the sensor is about to go high, as shown in FIG. 6a, so as to produce positive torque 38 to pull the rotor towards the neutral axis 35 in the desired direction 37. As soon as the output of the sensor has gone high, the first armature coil is de-energised and the second armature coil is excited. As a result of the fact that the rotor is moving slowly, the rotor does not reach the neutral axis 35 and the change in the armature excitation produces negative torque 39 which pulls back the rotor through the sensor axis 36, as shown in FIG. 6b. Thus it will be appreciated that oscillation of the rotor results, and the microcontroller cannot easily distinguish between such oscillation and motoring at a reasonable speed. With one load of relatively high inertia, typical oscillation frequencies have been recorded at 50–60 Hz. This appears to the microcontroller to be identical to normal motoring at between 750 and 900 r/min.

The solution to the start-up problem which has been developed is to add a time delay to the first few position sensor edges, in order to delay the reversal of excitation. This is illustrated in FIGS. 7a, 7b, 7c, 7d and 8a, 8b, 8c, 8d for two starting conditions, namely start-up when rotor is parked just ahead of the sensor transition and start-up when the rotor is parked just after the sensor transition. Referring first to start-up when the rotor is parked just ahead of the sensor transition, as before the output of the sensor is initially low and the first armature coil is energised just as the output of the sensor is about to go high so as to produce positive torque 38 to pull the rotor towards the neutral axis 35 in the desired direction 37, as shown in FIG. 7a. However, when the output of the sensor has gone high, energisation of the first armature coil is continued for 15 ms before the first armature coil is de-energised and the second armature coil is excited. As a result rotation of the rotor towards the neutral axis 35 by the positive torque 38 is continued, as shown in FIG. 7b, until the change in the armature excitation is effected at the end of the time delay when the rotor is positioned beyond the neutral axis 35, as shown in FIG. 7c. Excitation of the second armature coil then produces positive torque 38 which continues to rotate the rotor in the correct direction, as shown in FIG. 7d.

Referring to start-up when the rotor is parked just after the sensor transition, in this case the rotor is parked with the sensor high and the second armature coil is energised so as to produce negative torque 39 rotating the rotor in the clockwise direction 37, as shown in FIG. 8a. Furthermore, despite the output of the sensor going low, energisation of the second armature coil is continued for 15 ms before the second armature coil is de-energised and the first armature coil is excited. As a result rotation of the rotor in the direction 37 by the negative torque 39 is continued, as shown in FIG. 8b. After this time delay, the change in the armature excitation is effected when the rotor is well clear of the danger zone, as shown in FIG. 8c. Excitation of the first armature coil then produces positive torque 38 which rotates the rotor in the correct direction to a position near or beyond the neutral axis 35 before the excitation is reversed, as shown in FIG. 8d.

Following extensive testing with a motor connected to a high inertia load it has been discovered that the time delay D needs to be a few milliseconds and can be as much as 15 milliseconds to guarantee starting without oscillation. This time delay is applied to the first three transitions of the position sensor. However it should be appreciated that the time delay D is related to the motor and load inertia and the level of excitation, and should therefore be chosen to match the particular application.

After the fourth transition of the rotor position sensor, the rotation of the motor is known to be in the correct direction and a normal acceleration routine can be adopted as described in co-pending Application No. PCT/GB00/03197—(M&C Ref. P51192PC). At the fourth position sensor transition the routine uses a calculated value for the armature excitation time delay which is sufficient to counteract the amount of mechanical advance of the sensor transition relative to the neutral axis. The routine also begins to calculate a value of pulse width modulation (PWM) duty cycle which can be used for each subsequent armature excitation. The value of the PWM duty cycle is calculated from the length of the previous high of the position sensor at the PWM switching frequency of approximately 5 kHz. This method is described fully in co-pending Application No. PCT/GB00/03197—(M&C Ref. P51192PC).

The PWM duty cycle is then progressively increased as the motor accelerates to limit the armature current and the snubber voltage. At low speeds the PWM duty ratio tends to be limited by the snubber voltage whilst, at medium and high speeds, the ratio is limited more by peak armature current. The field voltage is chopped at the same ratio as the armature voltage for the first four sensor transitions, but after that the field is continuously energised with 100% voltage. When the sensor frequency approaches 500 Hz, the duty cycle of the PWM ramp reaches 100% and, beyond this, speed control is achieved by the length of the armature on time during each sensor cycle.

In a preferred embodiment of this invention utilising the series version of the flux switching motor, a first armature winding is de-energised following the first sensor transition after start-up, but the second armature winding is not energised until the end of the delay time which is determined as above for the shunt motor but which, for a typical load, may be several milliseconds or even up to 20 milliseconds. This embodiment is in contrast to the preferred shunt motor implementation in which the excitation of the first armature winding continues until the end of the delay time.

Whilst the above starting methods are seen as the preferred embodiments for each of the shunt and series connected motors respectively, it should be appreciated that either version of motor can be successfully started with either method.

Figure 1A:
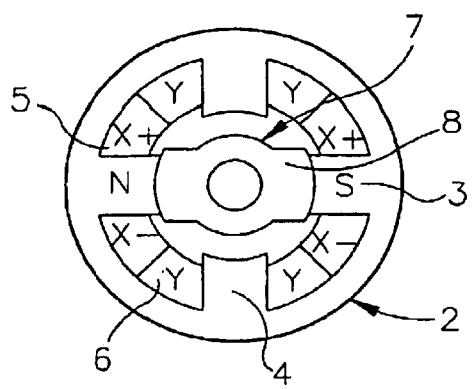
FIGS. 1a and 1b are explanatory diagrams showing a conventional two-phase variable reluctance motor, with the two excitation modes being shown in FIGS. 1a and 1b.
Figure 1B:
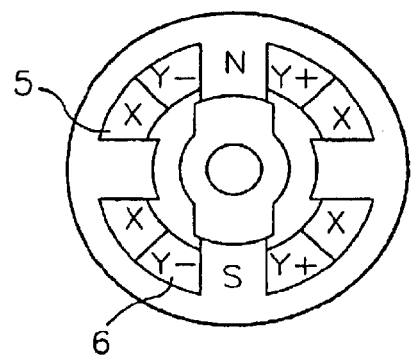
Figure 2A:
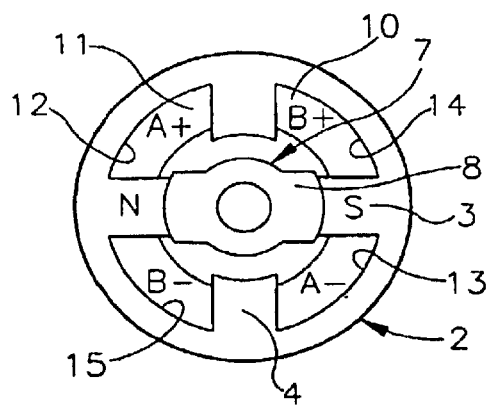
FIGS. 2a and 2b are explanatory diagrams showing a flux-switching motor, with the two excitation modes being shown in FIGS. 2a and 2b.
Figure 2B:
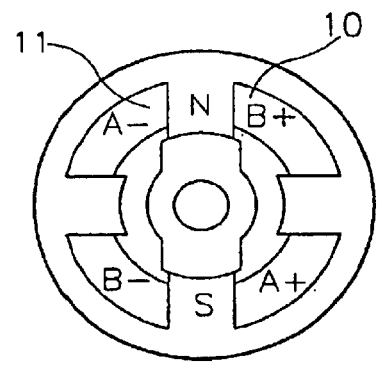
Figure 3A:
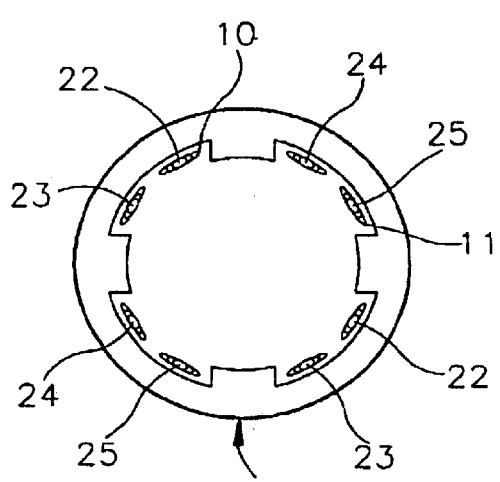
FIGS. 3a and 3b are explanatory diagrams showing the stator windings for a two-phase flux-switching motor as disclosed in WO 98/05112.
Figure 3B:
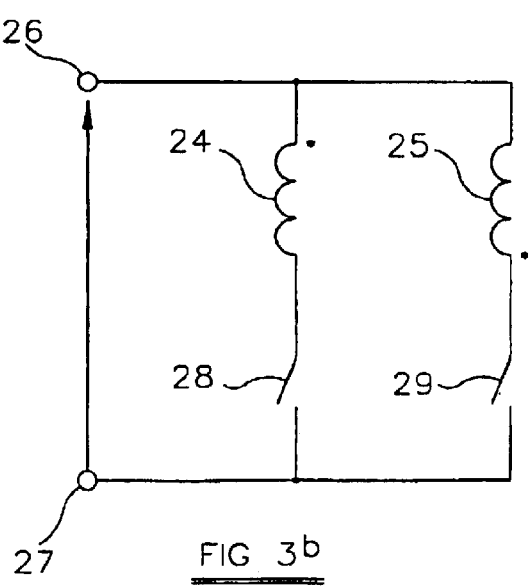

The starting methods are also applicable to switched reluctance motors of the type shown in FIGS. 1a and 1b, or permanent magnet synchronous motors (brushless d.c.). It would be usual for the rotor position sensor in such a motor to be mechanically positioned in advance of the point at which the torque changes polarity such that current can easily be established when the motor is running at high speed. With a high inertia load it is also possible to obtain oscillations of the rotor at start up if the proposed starting method is not used.

It will be appreciated that, although power MOSFET's are used in the energisation circuitry of FIGS. 5a and 5c, it would also be possible for other types of switches to be used in the circuitry, such as thyristors and IGBT's (insulated-gate bipolar transistors).

What is claimed is:

1. An electrical machine comprising a rotor without windings, a stator having a winding, circuit means for controlling the current in the winding, and position sensing means for monitoring the rotational position of the rotor and for supplying output signals at a rate dependent on the speed of rotation of the rotor, characterised by control means for supplying control signals to the circuit means to control the current in the winding in response to said output signals, the control means being arranged to introduce a time delay in the production of each control signal in an initial start-up period as compared with the production of the control signals over subsequent cycles of rotation during acceleration of the rotor, a plurality of output signals being produced by the position sensing means during the initial start-up period which occurs over at least part of the first cycle of rotation of the rotor on start-up of the rotor from rest.

2. A machine according to claim 1, wherein position sensing means is provided for monitoring the rotational position of the rotor with respect to time so as to provide an output indicative of the speed of rotation of the rotor.

3. A machine according to claim 1, wherein the position sensing means is adapted to supply output signals providing an advanced indication of the rotational position of the rotor with respect to time.

4. A machine according to claim 1, wherein the control means is arranged to produce each control signal in response to detection of a respective one of said out put signals from the position sensing means, each control signal being maintained for a length of time determined by the duration of said output signal.

5. A machine according to claim 1, wherein the winding is an armature winding, and the stator is also provided with field magnet means for generating a magnetomotive force in a direction extending transversely of the magnetomotive force generated by the armature winding, the circuit means controlling the current in the armature winding such that periods in which a magnetomotive force in one direction is associated with a first current pulse alternate with periods in which a magnetomotive force in the opposite direction is associate with a second current pulse.

6. A machine according to claim 1, wherein the armature winding comprises armature coils connected to the circuit means such that the currents in the coils vary in synchronism with rotation of the rotor under control of the control means in such a manner that periods in which a magnetomotive force in one direction is associated with current flow in one of the coils alternate with periods in which a magnetomotive force in the opposite direction is associated with current flow in the other coil.

7. A machine according to claim 6, wherein the coils are closely coupled magnetically.

8. A machine according to claim 6, wherein the circuit means comprises respective switch means for alternately conducting first current pulses in one of the armature coils and second current pulses in the other armature coil under the control of the control means.

9. A machine according to claim 1, wherein the field magnet means comprises a field winding wound on the stator and supplied with substantially unidirectional current by the circuit means.

10. A machine according to claim 9, wherein the field winding is connected in a parallel configuration with the armature winding.

11. A machine according to claim 9, wherein the field winding is connected in a series configuration with the armature winding.

12. A machine according to claim 1, wherein, in a low speed mode, the control means is arranged to produce pulse width modulated control signals having a duty cycle which increases with increasing speed of the rotor to control the current in the armature winding when the rotor is rotating at a relatively low speed.

13. A machine according to claim 12, wherein, in the low speed mode, the control means is also arranged to produce pulse width modulated control signals to control the current in the field winding.

14. A machine according to claim 1, wherein the position sensing means is a sensor for providing an electrical out put in response to detection of markings on the rotor.

15. A machine according to claim 1, wherein the position sensing means is a sensor for detecting variation of a parameter of the armature winding or the field magnet means or a separate sensor winding provided on the stator.

16. A machine according to claim 1, which is a flux-switching motor.

17. A machine according to claim 1, which is a switched reluctance motor.

18. A machine according to claim 1, which is a permanent magnet synchronous motor.

* * * * *